United States Patent
Grant et al.

(10) Patent No.: US 10,208,622 B2
(45) Date of Patent: Feb. 19, 2019

(54) SPACER FOR POWER TURBINE INLET HEAT SHIELD

(71) Applicant: United Technologies Corporation, Hartford, CT (US)

(72) Inventors: Fernando K. Grant, South Windsor, CT (US); Fabian D. Betancourt, Meriden, CT (US)

(73) Assignee: United Technologies Corporation, Farmington, CT (US)

( * ) Notice: Subject to any disclaimer, the term of this patent is extended or adjusted under 35 U.S.C. 154(b) by 375 days.

(21) Appl. No.: 15/027,027

(22) PCT Filed: Oct. 6, 2014

(86) PCT No.: PCT/US2014/059229
§ 371 (c)(1),
(2) Date: Apr. 4, 2016

(87) PCT Pub. No.: WO2015/054095
PCT Pub. Date: Apr. 16, 2015

(65) Prior Publication Data
US 2016/0237854 A1 Aug. 18, 2016

Related U.S. Application Data

(60) Provisional application No. 61/888,633, filed on Oct. 9, 2013.

(51) Int. Cl.
*F01D 25/14* (2006.01)
*F01D 25/24* (2006.01)
(Continued)

(52) U.S. Cl.
CPC ........... *F01D 25/145* (2013.01); *F01D 15/10* (2013.01); *F01D 25/243* (2013.01); *F01D 25/30* (2013.01);
(Continued)

(58) Field of Classification Search
CPC .. F01D 25/145; F01D 25/243; F05D 2240/15; F05D 2260/231
See application file for complete search history.

(56) References Cited

U.S. PATENT DOCUMENTS

| 4,053,189 A | 10/1977 | Novotny |
| 4,086,759 A | 5/1978 | Karstensen et al. |

(Continued)

OTHER PUBLICATIONS

International Searching Authority, PCT Notification of transmittal of the International search report and the written opinion, dated Jan. 8, 2015, 10 pages.

(Continued)

*Primary Examiner* — Jason D Shanske
*Assistant Examiner* — Brian O Peters
(74) *Attorney, Agent, or Firm* — Kinney & Lange, P.A.

(57) ABSTRACT

A gas turbine engine comprises an exhaust section member, a turbine section member, a heat shield and a spacer. The turbine section member is coupled to the exhaust section member. The heat shield is retained between the exhaust section member and the turbine section member. The spacer is positioned between the exhaust section member and the turbine section member to produce a gap for the heat shield. In one embodiment, the exhaust section member comprises a duct and the turbine section member comprises a bearing support.

17 Claims, 5 Drawing Sheets

(51) Int. Cl.
*F01D 25/30* (2006.01)
*F02C 3/10* (2006.01)
*F01D 15/10* (2006.01)

(52) U.S. Cl.
CPC ............ *F02C 3/10* (2013.01); *F05D 2220/32* (2013.01); *F05D 2240/15* (2013.01); *F05D 2240/35* (2013.01); *F05D 2260/231* (2013.01)

(56) References Cited

U.S. PATENT DOCUMENTS

| | | |
|---|---|---|
| 4,529,355 A | 7/1985 | Wilkinson |
| 4,566,851 A | 1/1986 | Comeau et al. |
| 4,688,378 A | 8/1987 | Harris |
| 4,987,736 A | 1/1991 | Ciokajlo et al. |
| 5,133,640 A | 7/1992 | Groenendaal, Jr. et al. |
| 5,211,536 A | 5/1993 | Ackerman et al. |
| 5,851,105 A | 12/1998 | Fric et al. |
| 6,612,809 B2 | 9/2003 | Czachor et al. |
| 7,353,647 B2 | 4/2008 | Orlando et al. |
| 2006/0239841 A1 | 10/2006 | Panek |
| 2009/0129916 A1 | 5/2009 | Young et al. |
| 2010/0296925 A1 | 11/2010 | Sakai |
| 2011/0081237 A1 | 4/2011 | Durocher et al. |
| 2012/0198810 A1 | 8/2012 | Ansari et al. |
| 2013/0223982 A1 | 8/2013 | Durocher et al. |

OTHER PUBLICATIONS

Extended European Search Report for EP Application No. 14852293.1, dated May 8, 2017, 9 pages.

SPACER FOR POWER TURBINE INLET HEAT SHIELD

BACKGROUND

The present disclosure relates generally to power turbines in a gas turbine engine. More particularly, the present disclosure relates to design and construction of heat shields and spacers in power turbines.

Power turbine inlets typically comprise annular ducts that connect the very aft end of a gas generator to a power generator in industrial gas turbines. The gas generator in a gas turbine engine produces high energy exhaust gases that drive a power turbine in the power generator. The power turbine rotates a shaft that is used to drive an electrical generator. A typical power turbine inlet comprises outer and inner annular ducts that extend between exit guide vanes in a low pressure turbine in the gas generator and $1^{st}$ stage vanes in the power generator. Thus, the power turbine inlet comprises a fairing that guides exhaust gases from the gas generator to the power turbine. As such, the power turbine inlet is subjected to the extreme high temperatures of the exhaust gases. In order to prevent the hot exhaust gases from escaping into the interior of the engine, such as into bearing compartments, it is further desirable to provide heat shields at gaps between the power turbine inlet and adjacent hardware.

SUMMARY

The present disclosure is directed to a coupling arrangement suitable for use in a gas turbine engine. In one embodiment, a gas turbine engine comprises an exhaust section member, a turbine section member, a heat shield and a spacer. The turbine section member is coupled to the exhaust section member. The heat shield is retained between the exhaust section member and the turbine section member. The spacer is positioned between the exhaust section member and the turbine section member to produce a gap for the heat shield.

In another embodiment, an exhaust duct mounting assembly comprises a bearing support, a duct member, a heat shield and a spacer. The duct member is coupled to the bearing support at a mechanical joint. The heat shield is disposed between the bearing support and duct member and is retained by the mechanical joint. The spacer is positioned in the mechanical joint to provide a slot between the bearing support and the duct member that permits the heat shield to slide.

In yet another embodiment, a gas turbine engine coupling comprises a gas path member, a static support member, a heat shield, a spacer and a fastener. The gas path member has a flange with a recess. The static support member has a rim with a bore. The heat shield extends along the flange and the rim and has an opening disposed adjacent the recess and bore. The spacer is disposed in the recess adjacent the bore and is configured to extend through the opening. The spacer has a through-bore. The fastener extends through the flange, the opening and the through-bore and into the bore.

DETAILED DESCRIPTION

Figure 1:
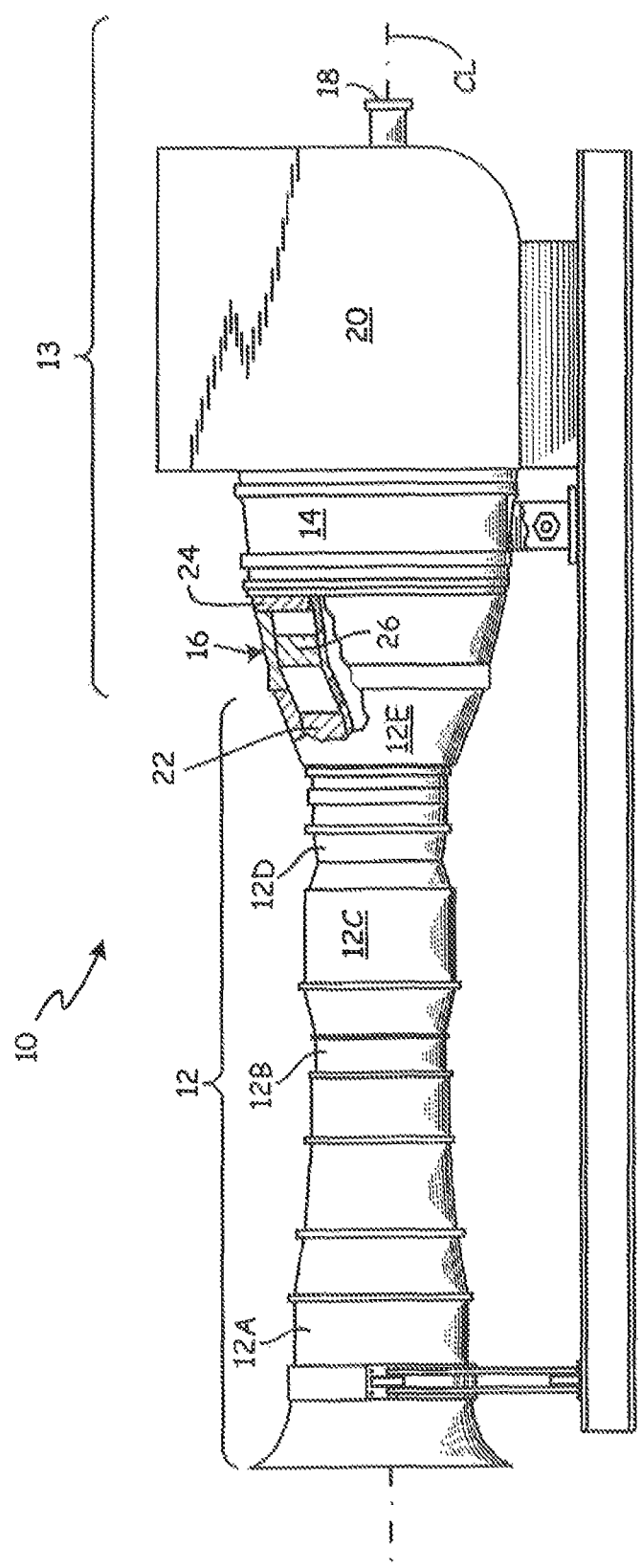
FIG. 1 is a partially broken away side view of an industrial gas turbine engine showing a power turbine inlet between a gas generator and a power generator.

FIG. 1 is a partially broken away side view of gas turbine engine 10 showing gas generator 12 connected to power generator 13 via power turbine inlet (PTI) 16.

In the illustrated embodiment, gas turbine engine 10 is an industrial gas turbine engine circumferentially disposed about a central, longitudinal axis or axial engine centerline CL. Gas generator 12 includes, in series order from front to rear, low pressure compressor section 12A, high pressure compressor section 12B, combustor section 12C, high pressure turbine section 12D, and low pressure turbine section 12E. Power generator 13 comprises PTI 16, power turbine 14, which is disposed aft of low pressure turbine 12E, output shaft 18 and exhaust duct 20. Rotation of power turbine 14 drives output shaft 18, which may be coupled to an electrical generator (not shown) that is also part of power generator 13. Gas generated by gas generator 12 passes through power turbine 14 and leaves engine 10 at exhaust duct 20.

As is known in the art of gas turbine engines, incoming ambient air becomes pressurized within low and high pressure compressors sections 12A and 12B. Fuel mixes with the pressurized air in combustor section 12C, where it is burned. Once burned, combustion gases expand through high and low pressure turbine sections 12D and 12E and into PTI 16. From PTI 16, the combustion gases flow into power turbine 14. High and low pressure turbine sections 12D and 12E drive high and low pressure rotor shafts, respectively, within engine 10 that rotate in response to the flow of the combustion gases thereby rotating the attached high and low pressure compressor sections 12B and 12A. Power turbine 14 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Similarly, although the present disclosure is described with reference to a PTI, the present invention is applicable to other components of gas turbine engines, such as turbine exhaust cases, intermediate cases, mid-turbine frames and the like.

Figure 2:
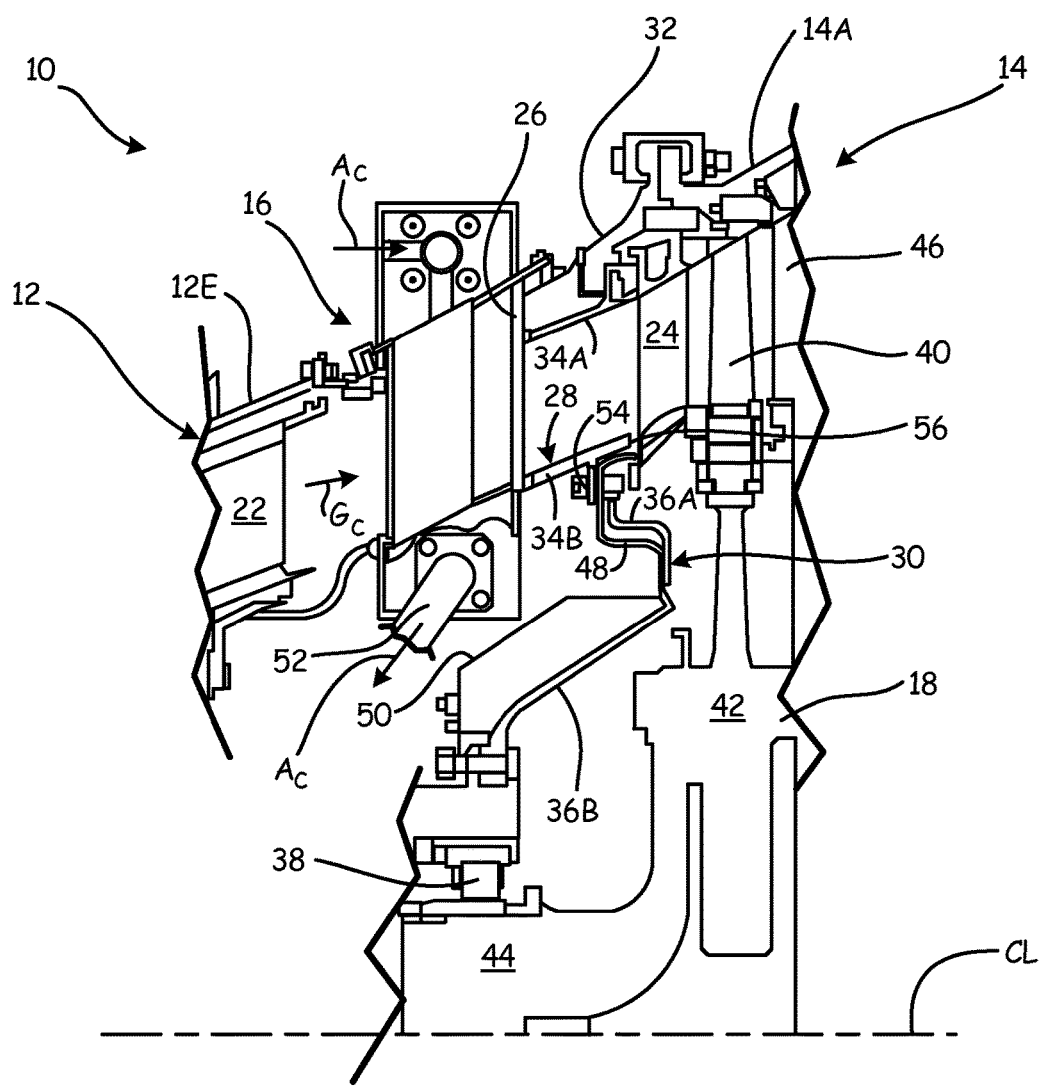
FIG. 2 is a simplified cross-section of a fairing mounted to a bearing support within the power turbine inlet of FIG. 1.

Power turbine inlet (PTI) 16 is positioned between low pressure turbine section 12E and power turbine 14. PTI 16 defines a flow path for gas exhausted from low pressure turbine section 12E that is conveyed to power turbine 14. PTI 16 also connects to other members within power generator 13 that provide structural support for gas turbine engine 10, such as a bearing support (FIG. 2). Exit guide vane 22 of low pressure turbine section 12E is joined to inlet guide vane 24 of power turbine 14 via PTI 16, which includes strut 26. PTI 16 may include one or more struts that allow for the introduction of air or lubricant into the interior of engine 10. The present disclosure relates to the placement of heat shields between components, such as strut 26 and an adjacent bearing support.

FIG. 2 is a simplified cross-section of fairing 28 mounted to bearing support 30 within power turbine inlet 16 of FIG. 1. PTI 16 also includes outer case 32, while fairing 28 comprises outer duct 34A and inner duct 34B. Bearing support 30 comprises outer diameter (OD) portion 36A and inner diameter (ID) portion 36B, which rests on bearing 38. Power turbine 14 includes inlet guide vane 24, turbine blade 40, turbine rotor 42, stub shaft 44 and vane 46. Heat shield 48 is mounted between inner duct 34B and OD portion 36A. Heat shield 50 is mounted proximate ID portion 36B.

Outer case 32 of PTI 16 spans the distance between low pressure turbine section 12E of gas generator 12 and power turbine 14 of power generator 13. Strut 26 extends inward from outer case 32 through fairing 28 so as to be positioned between exit guide vane 22 and inlet guide vane 24. Outer duct 34A of fairing 28 is coupled to outer case 32 and inner duct 34B is coupled to bearing support 30. As such, fairing 28 is held in place around strut 26. Stub shaft 44 of power generator 13 is inserted into bearing 38 so as to be rotatable about engine centerline CL. Bearing support 30 extends from bearing 38 to inlet guide vane 24, which connects to outer case 32 in order to provide support to bearing 38 within engine 10. Rotor 42 is connected to stub shaft 44 and turbine blade 40 is mounted to rotor 42 so as to be rotatable within power turbine 14 between inlet guide vane 24 and vane 46.

During operation of engine 10, combustion gas $G_C$ from gas generator 12 passes from low pressure turbine section 12E to power turbine 14 through power turbine inlet (PTI) 16. Exit guide vane 22, strut 26, which is shaped as a vane, and inlet guide vane 24 steer gas $G_C$ into power turbine 14. Gas $G_C$ impinges on turbine blade 40 to cause rotation of rotor 42, which rotates stub shaft 44 within bearing 38. Rotation of rotor 42 drives output shaft 18, which is used to generate electrical energy. In order to maintain bearing 38 static within engine 10, bearing support 30 extends to immobilized components of engine 10, ultimately to outer case 32. PTI 16 is provided with a source of cooling air $A_C$ in order to assist in withstanding temperatures of gas $G_C$. Cooling air $A_C$, such as from high pressure compressor section 12B (FIG. 1), is directed into engine 10 through strut 26 and further into heat shield 50 via tube 52. Heat shield 48 receives cooling air $A_C$ from heat shield 50 to purge gas $G_C$ from near OD portion 36A. As such, heat shield 48 protects bearing support 30 from exposure of heat from gas $G_C$ within PTI 16.

Cooling air $A_C$ is further used to limit ingestion of gas $G_C$ between inner duct 34B and inlet guide vane 24. As such, cooling air $A_C$ passes through holes in OD portion 36A. Heat shield 48 passes through coupling 54 between inner duct 34B and OD portion 36A to allow heat shield 48 to direct cooling air $A_C$ to gap 56. The present invention relates to a coupling for a turbine exhaust duct or case that allows for thermal expansion between components, while also minimizing leakage of cooling air. In one embodiment, coupling 54 includes a spacer that provides a gap that allows for thermal expansion of heat shield 48.

Figure 3:
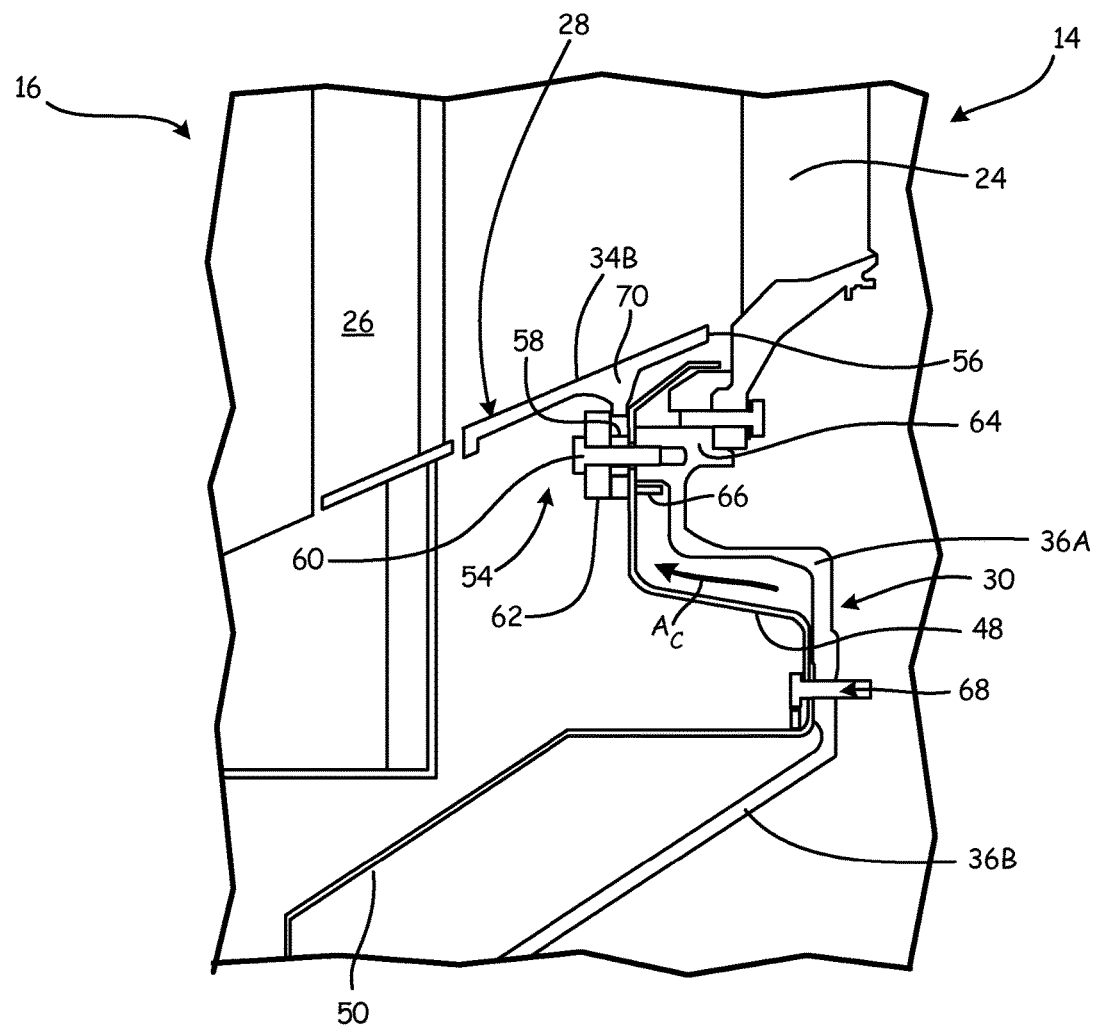
FIG. 3 is a cross-sectional view of a spacer used to support a heat shield between the fairing and the bearing support of FIG. 2.

FIG. 3 is a cross-sectional view of spacer 58 used to support heat shield 48 between fairing 28 and bearing support 30 of FIG. 2. Coupling 54 joins inner duct 34B to OD portion 36A utilizing spacer 58, fastener 60 and retention ring 62. OD portion 36A includes rim 64 and notches 66.

Heat shield 48 extends from coupling 68 at heat shield 50 to coupling 54 at inner duct 34B. Cooling air $A_C$ from within heat shield 50 passes through coupling 68 into the area between heat shield 48 and OD portion 36A. Notches 66 allow cooling air $A_C$ to pass through OD portion 36A to reach fairing 28. Heat shield 48 conforms to the general shape of OD portion 36A and passes through coupling 54. Thus, heat shield 48 simultaneously shields OD portion 36A from heat and guides cooling air $A_C$ to gap 56 near inner duct 34B. Spacer 58 is positioned within coupling 54 to provide a slip joint for linking flange 70 and heat shield 48 to OD portion 36A.

Coupling 54 comprises a mechanical linkage that connects flange 70 of inner duct 34B to rim 64 of OD portion 36A. The mechanical linkage can be repeatedly, in a non-destructive manner, assembled and disassembled without damaging any of the components. Spacer 58 is positioned within coupling 54 to permit heat shield 48 and inner duct 34B to thermally expand, while minimizing leakage of cooling air $A_C$ through coupling 54. As will be discussed in greater detail with reference to FIG. 4, fastener 60 applies compressive loading to spacer 58 between retention ring 62 and rim 64. Spacer 58 allows flange 70 to slide along retention ring 62 and heat shield 48 to slide between flange 70 and rim 64.

Figure 4:
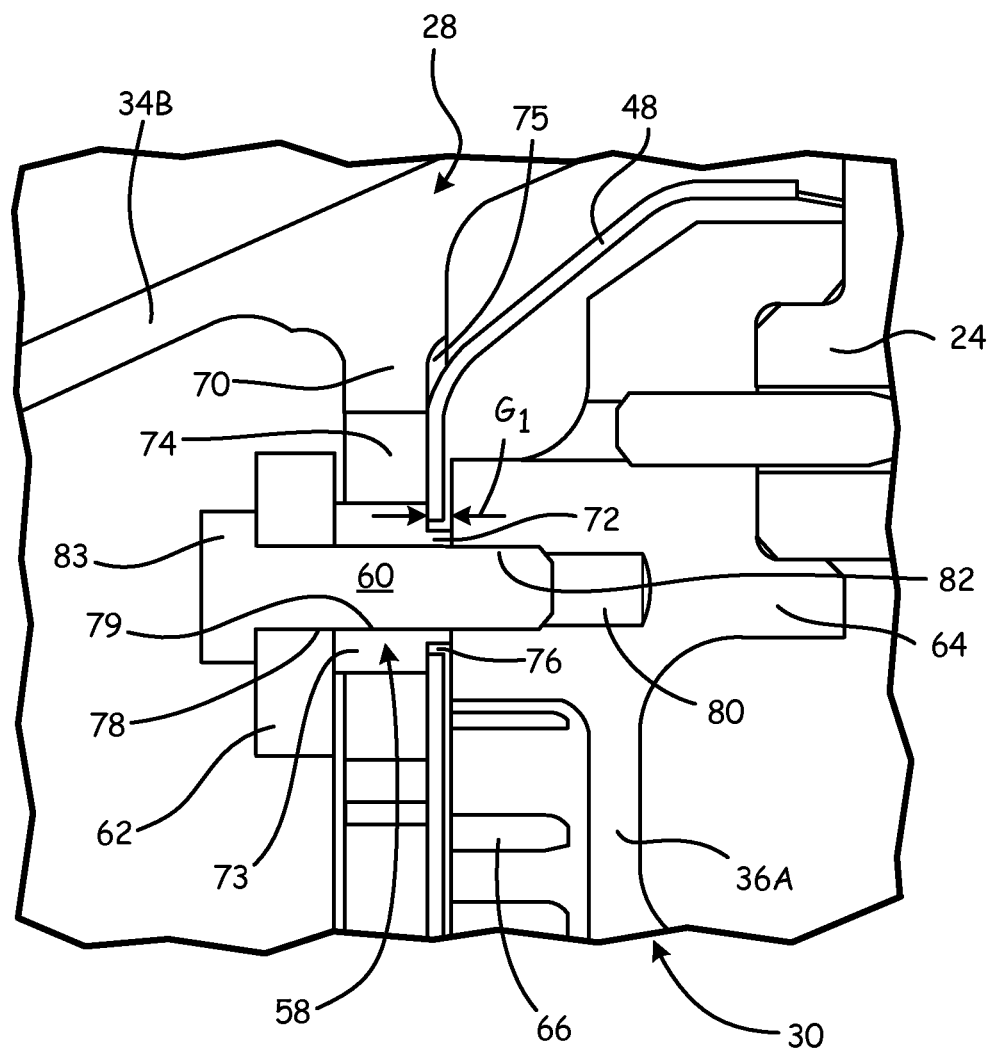
FIG. 4 is a close-up of the cross-section of FIG. 3 showing a flange on the spacer producing a gap between the fairing and bearing support.

FIG. 4 is a close-up of the cross-section of FIG. 3 showing spacer flange 72 extending from body 73 of spacer 58 to produce gap $G_1$ between inner duct 34B of fairing 28 and OD portion 36A of bearing support 30. Flange 70 includes slot 74 in which spacer 58 is disposed.

Heat shield 48 is positioned within recess 75 of flange 70, and rim 64 is positioned proximate flange 70. With heat shield 48 disposed between flange 70 and rim 64, spacer 58 is inserted into slot 74 such that spacer flange 72 extends into opening 76 in heat shield 48. Retention ring 62 is positioned adjacent flange 70 opposite rim 64 such that bore 78 is adjacent spacer 58. Fastener 60 is inserted through bore 78 in retention ring 62, through-bore 79 in spacer 58 and opening 76 in heat shield 48, and into bore 80 in rim 64. Fastener 60 engages bore 80 at threaded coupling 82.

Fastener 60 is joined to rim 64 so as to rigidly couple retention ring 62 to rim 64 using head 83. In so doing, spacer 58 is immobilized between retention ring 62 and rim 64. In particular, spacer flange 72 of spacer 58 is pushed against rim 64 such that a load path from rim 64, through spacer 58 to retention ring 62 is produced. Opening 76 of heat shield 48 is sized closely to the outer diameter size of spacer flange 72 so as to minimize the leakage of cooling air $A_C$ out of heat shield 48. Spacer flange 72 extends from body 73 of spacer 58 so as to provide gap $G_1$ between flange 70 and rim 64. Spacer flange 72 extends into recess 75 and is thicker than the thickness of heat shield 48. As such, gap $G_1$ provides a slot or pocket that allows heat shield 48 to slide between spacer body 73 and rim 64 to thereby account for thermal growth of heat shield 48. Similarly, body 73 of spacer 58 is thicker than flange 70 (minus recess 75) so that slot 74 of flange 70 can slide around spacer 58 thereby allowing for thermal growth of inner duct 34B. As shown, slot 74 extends to the radial inner end of flange 70 so as to be deeper than the height of body 73. Thus, spacer 58 allows for the sizes of fairing 28 and heat shield 48 to expand and contract during operation of gas turbine engine 10 to reduce stress induced in those and other components. In particular, hoop stress in heat shield 48 is reduced because movement of the outer diameter end of heat shield 48 is unconstrained and can move freely.

Figure 5:
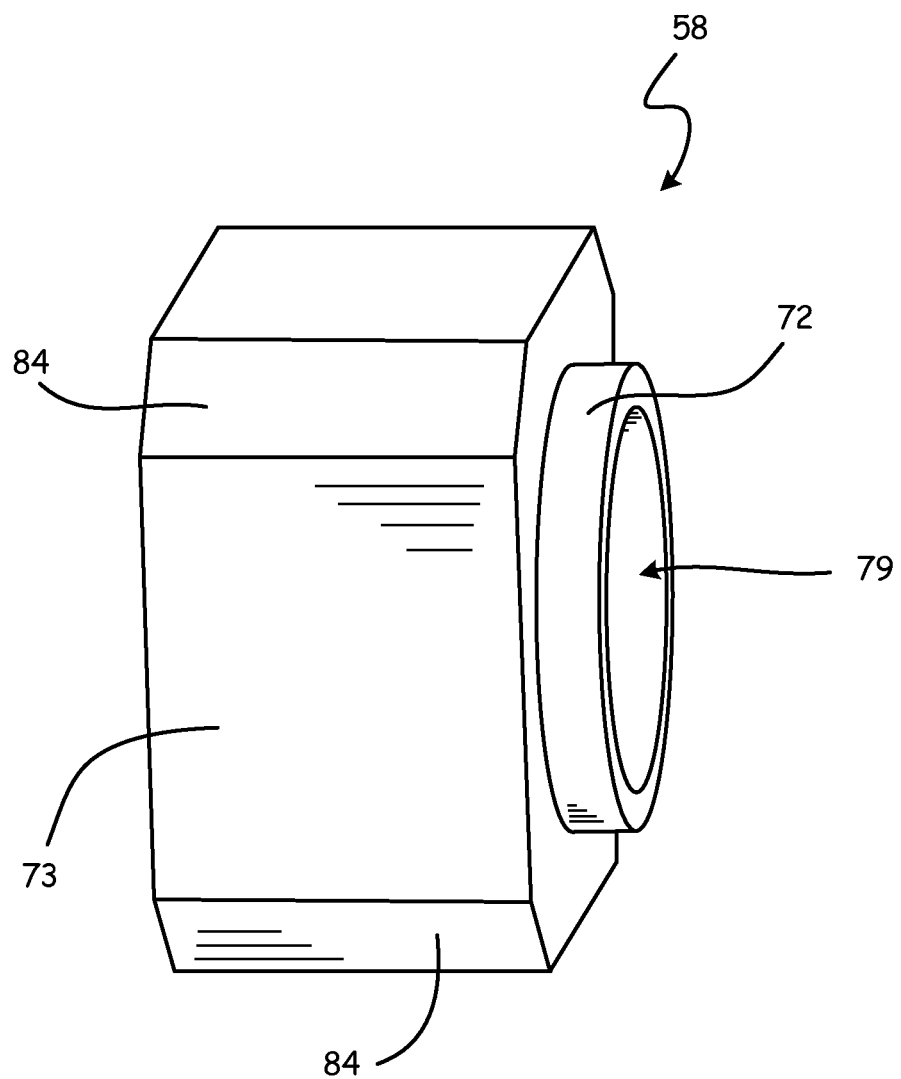
FIG. 5 is a perspective view of the spacer of FIG. 4 showing a flange surrounding a through-bore.

FIG. 5 is a perspective view of spacer 58 of FIG. 4 showing spacer flange 72 extending from body 73 to surround through-bore 79. In the embodiment shown, body 73 is generally rectilinear, particularly square. Body 73 additionally includes chamfers 84 that facilitate insertion of spacer 58 into slot 74 of flange 70 (FIG. 4). In other embodiments, body 73 may have other shapes, such as round.

Spacer flange 72 extends from body 73 adjacent through-bore 79. In the embodiment shown, spacer flange 72 comprises a collar that circumscribes through-bore 79. In other embodiments, spacer flange 72 may be intermittent so as to form a series of segmented arcs. However, it is desirable to completely seal around the perimeter of opening 76 (FIG. 4) in heat shield 48. Thus, the outer diameter shape of spacer flange 72 is round to match the shape of opening 76. Opening 76 and spacer flange 72 may have other shapes in other embodiments.

Through-bore 79 extends through both body 73 and spacer flange 72. The diameter of through-bore 79 is sized to closely match the diameter of the shaft of fastener 60 so as to seal against fastener 60. In the described embodiment, through-bore 79 is not threaded to engage fastener 60, but may be in other embodiments. In other embodiments, through-bore 79 may comprise a passage having shapes other than circular, depending on the mechanical fastener being used to couple retention ring 62 to rim 64.

Spacer 58 of the present invention provides a robust spacer that is capable of being used in the rigorous environment of a gas turbine engine. Specifically, spacer 58 can be used between an exhaust section member, such as fairing 28, and a turbine section member, such as bearing support 30. Spacer 58 is strong enough to survive loading from PTI 16 and power turbine 14, as well as being rugged enough to survive the elevated temperatures generated by gas generator 12. Spacer 58 additionally joins various turbine members together in a fashion that allows such members to expand, move and/or shift due to varying loading and thermal conditions produced during operation of a gas turbine engine.

Discussion of Possible Embodiments

The following are non-exclusive descriptions of possible embodiments of the present invention:

A gas turbine engine comprises an exhaust section member, a turbine section member, a heat shield and a spacer. The turbine section member is coupled to the exhaust section member. The heat shield is retained between the exhaust section member and the turbine section member. The spacer is positioned between the exhaust section member and the turbine section member to produce a gap for the heat shield.

The gas turbine engine of the preceding paragraph can optionally include, additionally and/or alternatively, any one or more of the following features, configurations and/or additional components:

An exhaust section member that is coupled to the turbine section member via a fastener extending through the exhaust section member, the heat shield and the turbine section member.

A retention ring connected to the exhaust section member via the fastener such that the exhaust section member is between the bolt ring and the heat shield.

A spacer that circumscribes the fastener within an opening in the heat shield; and that circumscribes the fastener within a slot in the exhaust section member.

A slot that is larger than the spacer to permit the spacer to slide in the slot.

A spacer that includes a collar that seals against the opening in the heat shield.

An exhaust section member that comprises a flange extending from a duct member, and a turbine section member that comprises a bearing support.

A bearing support that extends between a power turbine bearing and a power turbine inlet guide vane.

A spacer that comprises a body, a through-bore extending through the body, and a flange extending from the body to extend the through-bore.

An exhaust duct mounting assembly comprises a bearing support, a duct member, a heat shield and a spacer. The duct member is coupled to the bearing support at a mechanical joint. The heat shield is disposed between the bearing support and duct member and is retained by the mechanical joint. The spacer is positioned in the mechanical joint to provide a slot between the bearing support and the duct member that permits the heat shield to slide.

The turbine exhaust section mounting assembly of the preceding paragraph can optionally include, additionally and/or alternatively, any one or more of the following features, configurations and/or additional components:

A spacer that is disposed within a slot of a flange extending from the duct member, and that extends into an opening in the heat shield.

A mechanical joint that comprises a retention ring positioned next to the flange, and a fastener coupling the retention ring, the flange, the heat shield, and the bearing support.

A fastener that applies pressure to the spacer between the retention ring and the bearing support, and a spacer that produces clearance between the flange and the bearing support for the heat shield.

A spacer that comprises a body having a thickness greater than a thickness of the slot, a collar extending from the body and having a thickness greater than a thickness of the heat shield, and a through-bore extending through the body within the collar.

A spacer that comprises a body having a thickness greater than a combined thickness of the flange and the heat shield, and a passage extending through the body.

A gas turbine engine coupling comprises a gas path member, a static support member, a heat shield, a spacer and a fastener. The gas path member has a flange with a recess. The static support member has a rim with a bore. The heat shield extends along the flange and the rim and has an opening disposed adjacent the recess and bore. The spacer is disposed in the recess adjacent the bore and is configured to extend through the opening. The spacer has a through-bore. The fastener extends through the flange, the opening and the through-bore and into the bore.

The gas turbine engine coupling of the preceding paragraph can optionally include, additionally and/or alternatively, any one or more of the following features, configurations and/or additional components:

A the spacer that forms a gap between the flange and the rim for the heat shield, the gap being wider than the heat shield is thick.

A recess that comprises a slot and the spacer extends through the slot and the opening.

A retention ring disposed adjacent the flange opposite the heat shield, wherein the fastener extends through the retention ring.

A spacer that further comprises a collar surrounding the through-bore, wherein the opening is sized to receive the collar, and the slot is wider than the spacer such that the spacer is slidable in the slot and the collar seals between the fastener and the opening.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
an exhaust section member;
a turbine section member coupled to the exhaust section member;
a heat shield retained between the exhaust section member and the turbine section member, wherein the exhaust section member is coupled to the turbine section member via a fastener extending through the exhaust section member, the heat shield and the turbine section member; and
a spacer positioned between the exhaust section member and the turbine section member to produce a gap for the heat shield.

2. The gas turbine engine of claim 1 wherein the turbine section member further comprises:
a retention ring connected to the exhaust section member via the fastener such that the exhaust section member is between the retention ring and the heat shield.

3. The gas turbine engine of claim 2 wherein:
the spacer circumscribes the fastener within an opening in the heat shield; and
the spacer circumscribes the fastener within a slot in the exhaust section member.

4. The gas turbine engine of claim 3 wherein the slot is larger than the spacer to permit the spacer to slide in the slot.

5. The gas turbine engine of claim 3 wherein the spacer includes a collar that seals against the opening in the heat shield.

6. The gas turbine engine of claim 1 wherein:
the exhaust section member comprises a flange extending from a duct member; and
the turbine section member comprises a bearing support.

7. The gas turbine engine of claim 6 wherein the bearing support extends between a power turbine bearing and a power turbine inlet guide vane.

8. The gas turbine engine of claim 1 wherein the spacer comprises:
a body;
a through-bore extending through the body; and
a flange extending from the body to extend the through-bore.

9. An exhaust duct mounting assembly comprising:
a bearing support;
a duct member coupled to the bearing support at a mechanical joint;
a heat shield disposed between the bearing support and duct member and retained by the mechanical joint; and
a spacer positioned in the mechanical joint to provide a gap between the bearing support and the duct member that permits movement of the heat shield, wherein the spacer is disposed within a slot of a flange extending from the duct member and extends into an opening in the heat shield.

10. The exhaust duct mounting assembly of claim 9 wherein the mechanical joint comprises:
a retention ring positioned next to the flange; and
a fastener coupling the retention ring, the flange, the heat shield, and the bearing support.

11. The exhaust duct mounting assembly of claim 10 wherein:
the fastener applies pressure to the spacer between the retention ring and the bearing support; and
the spacer produces clearance between the flange and the bearing support for the heat shield.

12. The exhaust duct mounting assembly of claim 9 wherein the spacer comprises:
a body having a thickness greater than a thickness of the slot;
a collar extending from the body and having a thickness greater than a thickness of the heat shield; and
a through-bore extending through the body within the collar.

13. The exhaust duct mounting assembly of claim 9 wherein the spacer comprises:
a body having a thickness greater than a combined thickness of the flange and the heat shield; and
a passage extending through the body.

14. A gas turbine engine coupling comprising:
a gas path member having a flange with a recess;
a static support member having a rim with a bore;
a heat shield extending along the flange and the rim and having an opening disposed adjacent the recess and bore;
a spacer disposed in the recess adjacent the bore and configured to extend through the opening, the spacer having a through-bore, wherein the spacer forms a gap between the flange and the rim for the heat shield, the gap being wider than the heat shield is thick; and
a fastener extending through the flange, the opening and the through-bore and into the bore.

15. The gas turbine engine coupling of claim 14 wherein the recess comprises a slot and the spacer extends through the slot and the opening.

16. The gas turbine engine coupling of 15 and further comprising:
a retention ring disposed adjacent the flange opposite the heat shield;
wherein the fastener extends through the retention ring.

17. The gas turbine engine coupling of claim 15 wherein the spacer further comprises:
a collar surrounding the through-bore;
wherein the opening is sized to receive the collar, and the slot is wider than the spacer such that the spacer is slidable in the slot and the collar seals between the fastener and the opening.

* * * * *